United States Patent Office 3,038,946
Patented June 12, 1962

3,038,946
ISOPROPYL BROMOTRINITROPROPYL ETHER
Harry D. Anspon, Easton, Pa., assignor to United States Rubber Company, New York, N.Y., a corporation of New Jersey
No Drawing. Filed July 7, 1950, Ser. No. 172,626
2 Claims. (Cl. 260—614)

This invention relates to a new compound, an isopropyl bromotrinitropropyl ether, and a method of making it from vinyl isopropyl ether and bromotrinitromethane. The new compound is potentially useful as an explosive and propellant. It is quite insensitive to hammer shock, and thus fairly safe to handle.

The new compound of my invention is an isopropyl bromotrinitropropyl ether boiling at 86–88° C. at 2 mm. Hg and having a refractive index ($n_D^{20}$) of 1.475. It is made by reacting bromotrinitromethane with vinyl isopropyl ether. The reactants are brought together, preferably in equimolar proportions and preferably in a suitable mutual solvent such as ethyl ether. Upon standing for several hours, the reaction mixture is treated to recover the reaction product, conveniently by vacuum distillation.

The reaction is believed to be as follows:

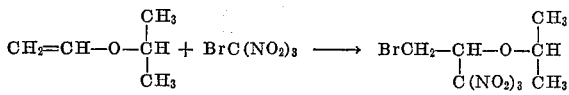

The new compound is assumed to be isopropyl 2-bromo-1-(trinitromethyl)-ethyl ether. The isomeric isopropyl 1-bromo-3,3,3-trinitropropyl ether is a less likely possibility.

In the following example parts are by weight except as noted.

Example

To 40 parts (by vol.) of an ether solution containing 6.9 parts (0.03 mol) of bromotrinitromethane are added 2.58 parts (0.03 mol) of vinyl isopropyl ether, causing an immediate exothermic reaction. The solution is left for several hours at room temperature and then fractionally distilled in vacuo, thereby obtaining 3.85 parts of a colorless liquid boiling at 86–88° C. at 2 mm. Hg and having a refractive index ($n_D^{20}$) of 1.4751, believed to be isopropyl 2-bromo-1-(trinitromethyl)-ethyl ether. It burns readily. Sensitivity: 2.5 kg. hammer >320 cm.

| Analysis | Calcd. for $C_5H_{10}N_3BrO_7$, percent | Found, percent |
|---|---|---|
| Carbon | 22.8 | 23.3 |
| Hydrogen | 3.2 | 3.3 |
| Nitrogen | 13.3 | 12.7 |
| Bromine | 25.3 | 24.8 |

I claim:
1. An isopropyl bromotrinitropropyl ether boiling at 86–88° C. at 2 mm. Hg and having a refractive index ($n_D^{20}$) of 1.475.
2. A method of making the compound described in claim 1 which comprises reacting bromotrinitromethane with vinyl isopropyl ether.

No references cited.